May 5, 1959 T. A. TARR 2,885,431
SEPARATION BY CRYSTALLIZATION
Filed June 21, 1954 3 Sheets-Sheet 1

Fig. A.

INVENTOR.
T. A. Tarr
BY
ATTORNEYS

INVENTOR.
T. A. Tarr

2,885,431
SEPARATION BY CRYSTALLIZATION

Thomas A. Tarr, Bartlesville, Okla., assignor to Phillips Petroleum Company, a corporation of Delaware Application June 21, 1954, Serial No. 438,051

14 Claims. (Cl. 260—475)

This invention relates to separation by crystallization. In one of its more specific aspects, the invention relates to improved apparatus for the separation of components of mixtures by fractional crystallization. In another of its more specific aspects, the invention relates to an improved method for separating the components of liquid mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

A method of separating a pure component from a mixture has been devised whereby the mixture to be separated is introduced into a heat exchange zone wherein a slurry of crystals is formed and that slurry of crystals is then introduced into an elongated purification chamber through which the crystals are moved as a compact mass. As disclosed by J. Schmidt, Re. 23,810, and by D. L. McKay in application Serial No. 375,850, filed August 24, 1953, the mass of crystals is then moved through the column to a melting zone wherein the crystals are melted. A portion of liquid corresponding to the melt is caused to move counter-currently through at least a portion of the crystal mass so as to displace occluded impurities from the crystal mass approaching the melting zone. The exact mechanism whereby this displaced liquid corresponding to the melt improves the purity of the final product is not completely understood. However, it is presently believed that the substantially pure material which is refluxed through at least a portion of the crystal mass displaces the mother liquor from the crystal mass approaching the melting zone and replaces the mother liquor in the interstices of the crystal mass. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to make some separations of the constituents of a mixture by fractional crystallization, it is necessary to adjust the temperature of the mixture to one which is far below the solidification point of any one of the pure constituents. For example, when para-xylene is separated from a mixture of isomeric alkyl benzenes, it is necessary to cool the mixture to a temperature in the neighborhood of about —57° to about —73° C., depending upon the concentration of the constituents in the mixture, in order to crystallize the para-xylene. When the crystals of para-xylene are introduced into a purification chamber wherein they are moved as a compact mass through the length of the chamber to a melt zone in a manner so as to displace a portion of the melt through at least a portion of the crystal mass, considerable difficulty is encountered. The substantially pure material obtained by melting crystals in the melt zone has in many instances, such as in the case of para-xylene, a freezing point which is much higher than that of the desired material in admixture with the other liquid components. For example, pure para-xylene has a freezing point of about 13° C. When such a high freezing point material is displaced through at least a portion of a crystal mass which is at a temperature much lower than the freezing point of that material, that relatively pure material freezes in the interstices of the crystal mass and completely closes off further flow of the melt through the compacted crystal mass. I have devised a method whereby continuous operation can be achieved at a high rate without encountering freezing of a solid impervious crystal plug in the purification column. This problem is, to my knowledge, only encountered in a system using a purification tube, such as is described hereinafter. This improvement is particularly important, since it results in a higher rate of recovery of a product of a purity which is higher than has been obtained with other types of fractional crystallization systems.

It is also highly desirable for the best operation of such a purification system to remove as much of the mother liquor from the crystals as possible before introducing those crystals into the purification column to be compacted. In this manner, many of the impurities can be eliminated from the purification system before subjecting the crystals to the final purification step.

I have devised a method whereby a considerable saving in thermal efficiency can be made in the production of a product which has 98+ percent purity and, in some cases, even as high as 99.9 percent purity with very high continuous yields. The process is applicable to numerous multi-component systems.

The following are objects of the invention.

An object of the invention is to provide an improved system for the separation of a pure component from liquid mixtures. Another object of the invention is to provide an improved process for the separation of a pure component from a liquid mixture. Another object of the invention is to provide a method for rapidly separating a component having a relatively high solidification point from a mixture which has a relatively low eutectic solidification point. Another object of the invention is to provide a process which will permit the continued displacement of pure material through at least a portion of a compacted crystal mass. Other and further objects of the invention will be apparent to those skilled in the art upon study of the accompanying disclosure.

Broadly speaking, this invention resides in the continuous removal of mother liquor from crystals, after which the crystals are heated so as to raise the temperature of the crystal mass to a temperature considerably above the temperature to which the feed is cooled in the crystal forming step. The warmed crystals are then introduced into a purification column wherein they are formed into an elongated compacted mass and passed through the column toward a melting zone maintained in one end portion thereof. As the crystals are passed into the melting zone, at least a portion thereof is melted and a portion of the melt is displaced upstream (with respect to crystal movement) through the crystal mass, displacing occluded impurities from the crystals. Relatively pure product is removed from the melting zone and displaced liquid is removed from an upstream position of the purification column.

Although, as I have pointed out hereinbefore, this invention is particularly applicable to systems in which the solidification point of the desired pure component is considerably higher than the temperature to which the component is cooled in the liquid mixture to form crystals thereof, this procedure can be advantageously utilized in practically any system to which fractional crystallization is applicable so as to increase the thermal efficiency of the process. This invention is applicable to separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say, 15 to 25 percent purity, so as to effect a purity upwards of 98 percent. In order to illustrate some of the systems to which the invention is applicable, the following compounds are grouped with respect to their boiling points.

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpeptane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| Ortho-nitrotoluene | 222.3 | α−10.6, β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawings, in which.

Figure 1:
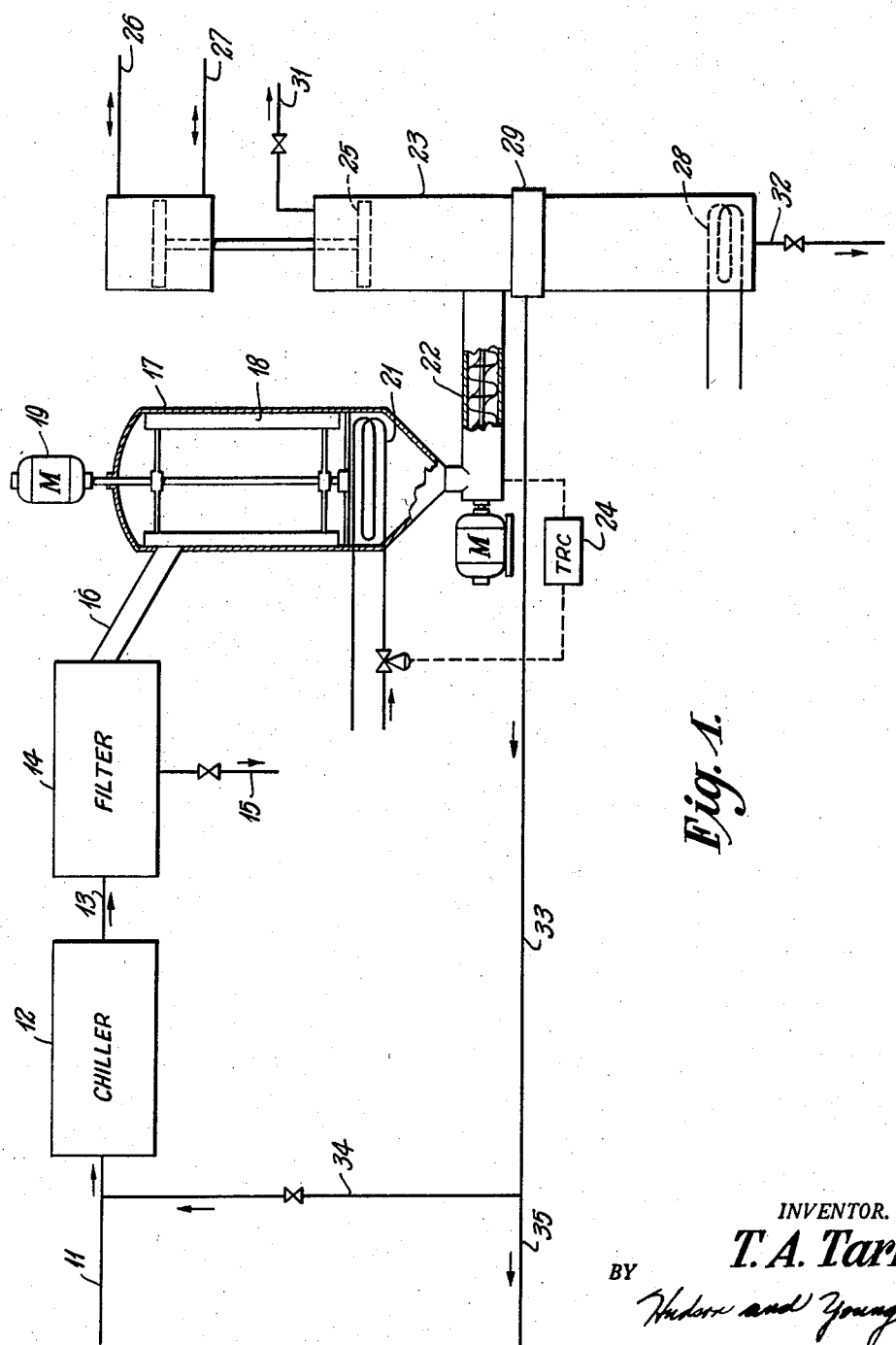
Figure 1 is a schematic representation of the fractional crystallization system of this invention.

Referring to Figure 1 of the drawings, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type which is supplied with refrigeration means that are adequate to lower the temperature of the liquid mixture to that necessary to crystalize at least a major portion of at least one of the constituents thereof. As will be apparent from the discussion hereinbefore, the temperature to which the mixture is adjusted in the heat exchanger will depend entirely upon the specific mixture, since the various materials have different solidification points and the solidification point of any given constituent of a mixture is dependent upon the constitution of the mixture. When a mixture of isomeric $C_8$ alkyl benzenes is fed through conduit 11 to chiller 12, that mixture is lowered to a temperature in the neighborhood of $-57°$ to $-73°$ C. When the desired product is relatively dilute in the feed stream, the temperature at which crystals will form will be relatively low. If the desired product is relatively concentrated in the feed, the temperature at which crystals will form will be relatively high. When materials having a high crystallization temperature are handled, the heat exchanger may be a heater rather than a chiller.

The slurry resulting from the chilling of the liquid mixture is fed through conduit 13 to filter 14 wherein uncrystallized material is separated from the crystals. The amount of uncrystallized material (mother liquor) which is left on the crystals is dependent upon the specific type of filter which is utilized. Any one of several different types of filters can be used for this step in my process. A rotary type filter, such as an Oliver filter, or one of the higher speed types, such as a centrifuge, can be utilized, or a pressure type filter in which the crystals are compacted by some compacting means, such as a piston, can be used. Crystals are removed from filter 14 through conduit 16 to a heating tank 17. Heating tank 17 is preferably supplied with a stirrer 18 which is motivated by a drive means, such as motor 19. Heat is supplied to heating chamber 17 by means of heating element 21. This heating element may be provided in the lower portion of heating chamber 17, as shown, or may be in the depicted form, together with a heating jacket surrounding the chamber. If desired, stirrer 18 can be eliminated from heating chamber 17 and heat exchange coils can be supplied to the interior of that chamber.

I advantageously control the supply of heat to heating chamber 17 in response to the temperature of the material removed from that chamber. Crystals are removed from chamber 17 through conduit 22. The crystal mass can be moved by means of a screw type conveyor, as shown, or by any other solids conveying means. The crystals are heated to such an extent that a portion of the crystals are melted and in that manner the crystal mass will be diluted and warmed. It is preferred to melt a sufficient amount of the crystals to form a slurry which has a solids content of not more than 45 percent by weight. It is preferred that the material from chamber 17 have a solids content of 35 to 45 percent by weight. If a sufficient volume of the crystals is melted, the crystals are moved from chamber 17 to purification tube or chamber 23 by gravity. When it is desired to move the crystals by gravity, conduit 22 should be disposed at an angle so as to facilitate the movement of crystals into chamber 23. Temperature recorder controller 24 is operatively connected to conduit 22 and to the inlet end of heat exchange element 21 so as to control the heat input to heater chamber 17 so as to insure the removal of the material from chamber 17 at at least a predetermined temperature, which temperature is selected in accordance with the freezing point of the material to be purified in chamber 23.

As the crystals are introduced into chamber 23, piston 25 is actuated by the flow of motivating fluid through conduits 26 and 27 so as to reciprocate piston 25 in chamber 23. In this fashion, the crystal mass is compacted in elongated purification chamber 23 and is caused to move in a downstream direction toward heating element 28. Heating element 28 may be in the form of heating coils within chamber 23 or may be in the form of a heating element closely surrounding the lower portion of chamber 23 or may be provided in the bottom surface of that column, or may be of any other conventional heater design.

A filter 29 is provided immediately downstream of conduit 22 in chamber 23. This filter is designed so as to permit the removal of liquid from the crystal mass by displacement and by compaction. Piston 25 can be imperforate, in which case all of the liquid displaced from the crystal mass is removed from chamber 23 through filter 29. As an alternative, however, piston 25 can be provided with a perforate lower face, which perforate lower face permits the passage of liquid material therethrough while moving the crystals in a downstream direction. When piston 25 is of the perforate type, liquid which is removed through that piston is removed from chamber 23 through conduit means, such as conduit 31. Purified product is removed from the downstream end portion or melting section of chamber 23 through conduit 32. Although the purified product is preferably removed in a melted form, that product can be removed at least partially as a solid, if desired.

The disposition which I make of the liquid material removed through filter 29 or conduit 31 depends to a large extent upon the amount of crystals melted while bringing the crystal mass to a relatively warm temperature in heating chamber 17. I prefer to raise the temperature of the crystal mass so as to melt at least a portion thereof in chamber 17. When I heat the crystals in this fashion, the liquid which is recovered through filter 29 and/or conduit 31 is enriched in the component which is being purified in chamber 23. Because the liquid is enriched in that component, that liquid is suitable for return to chiller 12, together with the feed mixture supplied through conduit 11. The liquid is returned through conduits 33 and 34. In this fashion, larger crystals of the desired product are formed in the chiller, which larger crystals are more easily processed in this system. It is preferred that the liquid have a concentration of the component being purified in chamber 23 higher than that of the feed introduced through conduit 11. When only a small amount of the crystals is melted in chamber 17, it is sometimes not economically feasible to return the liquid recovered through filter 29 and/or conduit 31 to chiller 12 since that liquid is not sufficiently enriched in the desired product to benefit the feed. In such a situation, that liquid is removed through conduit 35 and can be discarded or in the case of some mixtures, such as the isomeric alkyl benzenes, it can be reformed to produce additional desired products.

Figure 2:
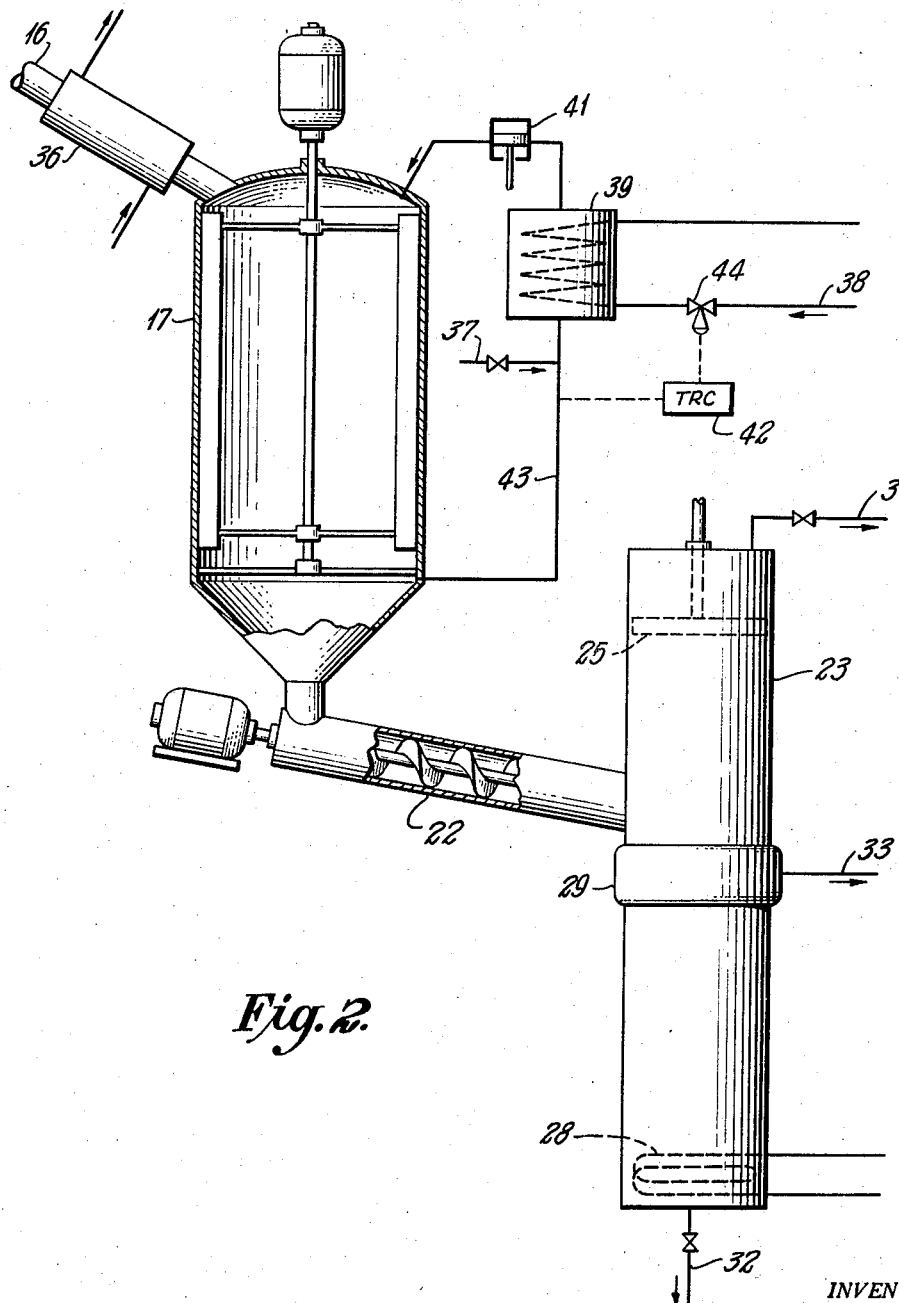
Figure 2 is a section view of a modified system of this invention.

Referring particularly to Figure 2 of the drawings, parts like those described in connection with Figure 1, are designated by like numerals. In this modification, conduit 16 is provided with a heat exchanger 36 through which heating material is passed, thus heating the crystals from filter 14 during their travel from filter 14 to heating chamber 17. Conduit 22 is modified so as to be disposed in an inclined position from the lower part of chamber 17 to chamber 23, thus facilitating the movement of the crystalline material from chamber 17 to chamber 23. Crystals in chamber 17 are heated in this modification by means of a hot gas which is supplied to the system through conduit 37 and is heated by means of a heat exchange fluid, such as steam supplied through conduit 38 to heat exchanger 39. The heated gas is pressurized by means of a compressor 41 and is preferably passed concurrently through chamber 17, together with the crystals. A gaseous heat exchange material which is inert to the crystalline material and which may be a material, such as nitrogen or carbon dioxide, is removed from the lower portion of chamber 17 and is passed to heat exchanger 39 wherein it is once again raised to the desired temperature. The heat which is supplied to heat exchanger 39 is controlled by means of temperature recorder controller 42 which is operatively connected to conduit 43 through which the heat exchange gas flows, and to valve 44 in conduit 38. The crystals which are moved from chamber 17 to chamber 23 are processed and purified in chamber 23, as described hereinabove, in connection with Figure 1 of the drawing.

Figure 3:
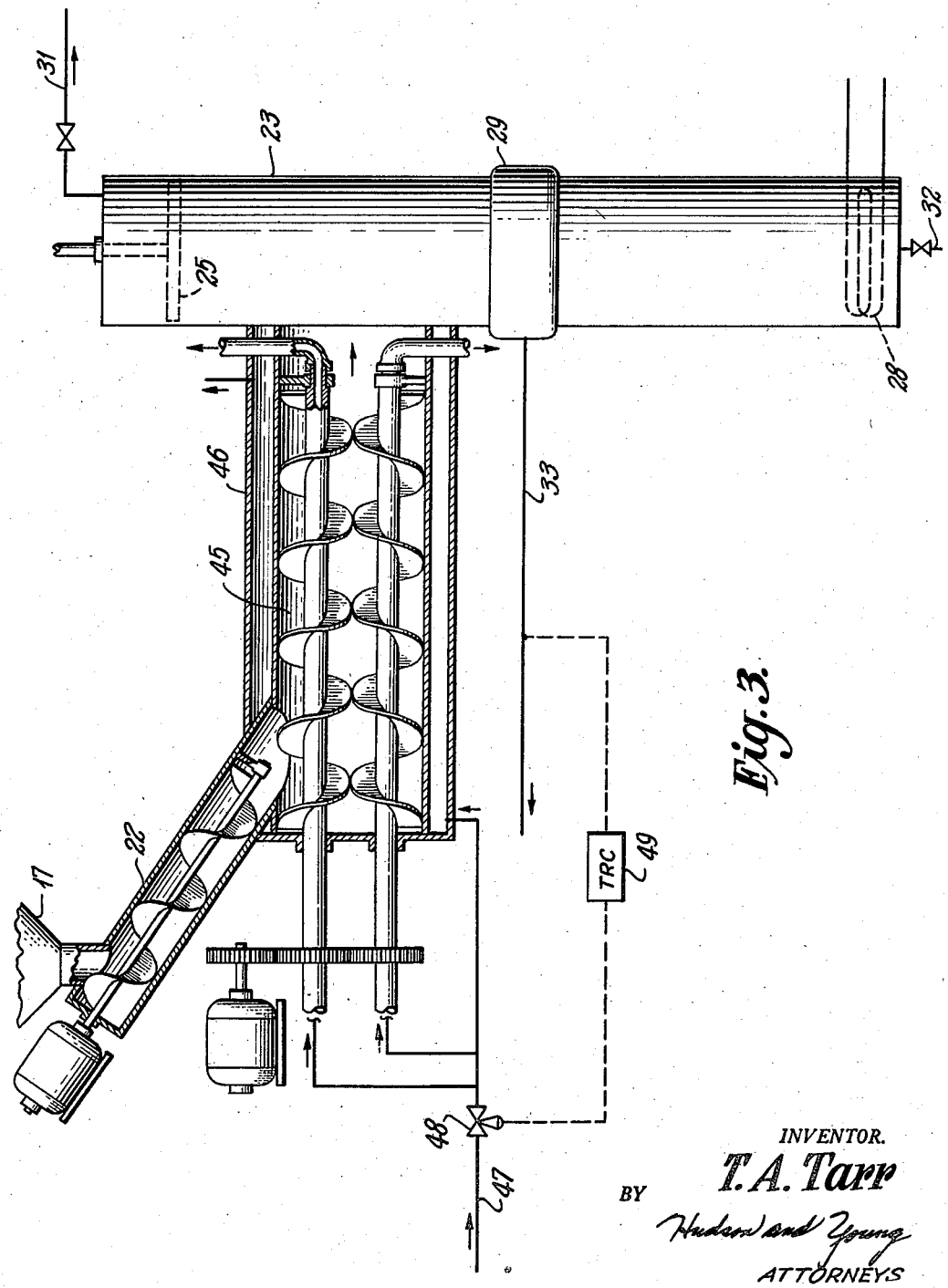
Figure 3 is a section view of a further modification of the system of this invention.

Referring particularly to Figure 3 of the drawing, parts like those discussed in connection with Figures 1 and 2, are designated with the same numerals. Crystals from chamber 17 are moved through conduit 22 to conduit 45 which is provided with a heat exchanger jacket 46 through which heating fluid is passed from conduit 47. Conduit 45 may be provided with one or more hollow conveyors. Additional heating fluid is moved through the hollow blades and shafts of the conveyor so as to additionally heat the crystals as they are transported into chamber 23. The amount of heating fluid which is supplied in heat exchange with conduit 45 is controlled by means of valve 48 which is operatively connected to temperature recorder controller 49 which is in turn operatively connected to a conventional temperature sensitive element in conduit 33. The temperature sensitive element can also be located in the discharge end of conduit 45.

In order to better illustrate my invention, I have provided the following example which exemplifies this invention but should not be construed to unduly limit the same. The percentages used herein are percentages by weight.

*Example*

A feed mixture comprising 17 percent para-xylene, 17.5 percent ortho-xylene, 33.4 percent meta-xylene, 27.5 percent ethyl benzene and 4.6 percent toluene is supplied to the system at a rate of 1,000 gallons per hour through conduit 11. Liquid material recovered as displaced liquid from chamber 23 through filter 29 comprises 53.1 percent para-xylene, 9.8 percent ortho-xylene, 18.7 percent meta-xylene, 15.6 percent ethyl benzene and 2.8 percent toluene. This stream is supplied to chiller 12 at 165 gallons per hour, together with the feed stream described hereinabove. The resulting composite feed comprises 22.1 percent para-xylene, 16.3 percent ortho-xylene, 31.0 percent meta-xylene, 26.2 percent ethyl benzene and 4.4 percent toluene at 1,165 gallons per hour. That material is lowered to a temperature of $-76°$ C. with the resultant formation of 15.1 percent solids. The slurry of mother liquor and crystals is passed to filter 14 wherein mother liquor having a para-xylene content of 6.75 percent is removed at a rate of 890 gallons per hour. The crystal material from which the mother liquor has been removed is 70 percent solids and is at a temperature of $-76°$ C. That material is supplied to heating chamber 17 wherein the crystal mass is heated to a temperature of $-23°$ C. and a stream of 40 percent solids at that temperature is moved to purification chamber 23 at a rate of 275 gallons per hour. The crystals are compacted in chamber 23 and are moved as a compact mass downstream to the heating zone wherein the crystals are melted and a portion of the melt is displaced upstream through the compact crystal mass. A product which is about 99 percent para-xylene is removed through conduit 32 at a rate of 110 gallons per hour.

It will be apparent to those skilled in the art that various modifications of this invention can be made upon study of the accompanying disclosure. Such modifications are believed to be clearly within the spirit and the scope of this invention.

I claim:

1. A process for the purification of crystals separated from a multicomponent mixture and containing occluded impurities which comprises heating said crystals whereby a substantial portion of said crystals are melted and the temperature of said crystals is increased; introducing said heated crystals into an upstream portion (with respect to crystal movement) of an elongated purification zone; moving said crystals as a compact mass toward one end of said zone; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

2. A process for the separation and purification of at least one of the components of a mixture which comprises adjusting the temperature of said mixture to one at which at least one but not all of said components is in crystalline form; separating resulting crystalline and non-crystalline material; heating said crystals to a temperature at which the heated material has a solids content of not more than 45 percent by weight; introducing said heated crystals into an upstream portion (with respect to crystal movement) of an elongated purification zone at a temperature at which a portion of said crystals was melted; moving said crystals toward a downstream end of said zone as a compact mass; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

3. The process of claim 2 wherein said heated material has a solids content in the range of 35 to 45 percent by weight.

4. The process of claim 2 wherein said mixture comprises para- and meta-xylenes.

5. The process of claim 2 wherein said mixture comprises dimethyl isophthalate and dimethyl terephthalate.

6. The process of claim 2 wherein said mixture comprises para- and meta-cymenes.

7. The process of claim 2 wherein said mixture comprises para- and meta-nitrotoluenes.

8. The process of claim 2 wherein said mixture comprises cyclohexane and 2,2-dimethylpentane.

9. A process for the separation and purification of at least one of the components of a mixture which comprises adjusting the temperature of said mixture to one at which at least one but not all of said components is in crystalline form; separating resulting crystalline and non-crystalline material; passing hot heat exchange fluid into heat exchange with said crystals sufficiently to raise the temperature of said crystals to form a melt having a solids content of not more than 45 percent by weight; introducing crystals of said heated material into an upstream portion (with respect to crystal movement) of an elongated purification zone at a temperature at which a portion of said crystals was melted; moving said crystals toward one end of said zone as a compact mass; melting at least a portion of said compact crystal mass in a downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

10. The method of claim 9 wherein said heating material is passed in heat exchange with said crystals at a rate controlled in accordance with the temperature of crystals passed to said purification zone.

11. The method of claim 9 wherein additional heat is supplied to said heated crystals in response to the temperature of said displaced liquid removed from the upstream end portion of said purification zone.

12. A process for the separation and purification of at least one of the components of a mixture which comprises adjusting the temperature of said mixture to one at which at least one but not all of said components is in crystalline form; separating resulting crystalline and non-crystalline material; passing hot gaseous material which is inert to said crystallized material through said crystals at a rate sufficient to raise said crystals to a temperature at which the heated material has a solids content of not more than 45 percent by weight; and separating said gaseous material from said heated material; introducing crystals of said heated material into an upstream portion (with respect to crystal movement) of an elongated purification zone at a temperature at which a portion of said crystals was melted; moving said crystals toward one end of said zone as a compact mass; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

13. A process for the separation and purification of at least one of the components of a mixture which comprises adjusting the temperature of said mixture to one at which at least one but not all of said components are crystalline; separating resulting crystalline and non-crystalline material; heating said crystals to a temperature at which the heated material has a solids content of not more than 45 percent by weight; introducing crystals of said heated material into an upstream portion (with respect to crystal movement) of an elongated purification zone at a temperature at which a portion of said crystals are melted; moving said crystals toward one end of said zone as a compact mass; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing a purified product from the downstream end portion of said purification zone; removing displaced liquid from an upstream end portion (with respect to crystal movement) of said purification zone, said displaced liquid having a concentration of the desired component greater than that in said mixture; and recrystallizing at least said component of said displaced liquid corresponding to said purified product; and subjecting said crystallized material to the steps enumerated above.

14. In a process for concentrating a compound which exists in admixture with other materials and is separable therefrom by crystallization, said process comprising cooling said admixture to a temperature at which said compound crystallizes therefrom, recovering crystals of said compound, introducing said crystals into a purification zone which comprises a liquid removal zone, a reflux zone and a melting zone, moving said crystals through said liquid removal zone, then through said reflux zone and then into said melting zone, melting crystals in said melting zone, removing a part of the resultant melt as product, and forcing another part of said melt in a direction countercurrent to the flow of crystals through said reflux zone, the improvement which comprises introducing crystals into said purification zone at a temperature which is substantially higher than said first mentioned temperature.

References Cited in the file of this patent

UNITED STATES PATENTS

| 2,613,136 | McKay | Oct. 7, 1952 |
| 2,614,134 | Powers | Oct. 14, 1952 |
| 2,615,794 | Shelby | Oct. 28, 1952 |
| 2,617,274 | Schmidt | Nov. 11, 1952 |
| 2,632,314 | Vance | Mar. 24, 1953 |
| 2,637,749 | Aston et al. | May 5, 1953 |
| 2,683,178 | Findlay | July 6, 1954 |
| 2,731,456 | Weedman | Jan. 17, 1956 |
| 2,758,141 | Findlay | Aug. 7, 1956 |